US012649257B2

(12) United States Patent
Lenz et al.

(10) Patent No.: US 12,649,257 B2
(45) Date of Patent: Jun. 9, 2026

(54) METHOD FOR MANUFACTURING MULTIPLE SEAL ARC SEGMENTS

(71) Applicant: RAYTHEON TECHNOLOGIES CORPORATION, Farmington, CT (US)

(72) Inventors: Brendan Lenz, Wethersfield, CT (US); John D. Riehl, Hebron, CT (US)

(73) Assignee: RTX CORPORATION, Farmington, CT (US)

( * ) Notice: Subject to any disclaimer, the term of this patent is extended or adjusted under 35 U.S.C. 154(b) by 163 days.

(21) Appl. No.: 18/296,633

(22) Filed: Apr. 6, 2023

(65) Prior Publication Data

US 2024/0335978 A1 Oct. 10, 2024

(51) Int. Cl.

| | |
|---|---|
| ***C23C 16/22*** | (2006.01) |
| ***B28B 1/42*** | (2006.01) |
| ***B28B 11/04*** | (2006.01) |
| ***B28B 11/14*** | (2006.01) |
| ***C23C 16/00*** | (2006.01) |
| ***F01D 5/28*** | (2006.01) |
| ***F01D 11/08*** | (2006.01) |

(52) U.S. Cl.

CPC ................ *B28B 1/42* (2013.01); *B28B 11/04* (2013.01); *B28B 11/14* (2013.01); *F01D 5/282* (2013.01); *F01D 11/08* (2013.01); *F05D 2230/90* (2013.01); *F05D 2300/6033* (2013.01)

(58) Field of Classification Search

CPC ...................................................... C23C 16/22

See application file for complete search history.

(56) References Cited

U.S. PATENT DOCUMENTS

| | | | | |
|---|---|---|---|---|
| 5,686,117 | A * | 11/1997 | Snyder | F16D 65/126 425/398 |
| 6,610,227 | B2 | 8/2003 | Nakamura | |
| 6,692,673 | B2 | 2/2004 | Nakamura | |
| 6,932,566 | B2 * | 8/2005 | Suzumura | F01D 11/125 415/137 |
| 7,018,480 | B2 | 3/2006 | Nakamura | |
| 10,450,897 | B2 | 10/2019 | Gallier et al. | |
| 2011/0293828 | A1 * | 12/2011 | Eberling-Fux | C04B 35/80 427/249.2 |
| 2012/0027572 | A1 * | 2/2012 | Denece | F01D 9/04 415/127 |

FOREIGN PATENT DOCUMENTS

EP 3575558 A1 * 12/2019 ............ F01D 11/005

OTHER PUBLICATIONS

Liu, X., et al., Cyclic Thermal Shock Damage Behavior in CVI SiC/SiC High-Pressure Turbine Twin Guide Vanes, Materials, vol. 14, (2021), 13 pages. (Year: 2021).*

* cited by examiner

*Primary Examiner* — Matthew J Daniels

(74) *Attorney, Agent, or Firm* — Carlson, Gaskey & Olds, P.C.

(57) ABSTRACT

A method includes laying-up a fabric made of ceramic tows to form a fiber preform that has a repeating pattern of seal arc sections, densifying the fiber preform with a ceramic matrix material to form a densified ceramic matrix composite body, and then either before or after the densifying, cutting the fiber preform or the densified ceramic matrix composite body, respectively, along boundaries between the seal arc sections to separate the seal arc segments from each other.

7 Claims, 4 Drawing Sheets

METHOD FOR MANUFACTURING MULTIPLE SEAL ARC SEGMENTS

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

A method according to an example of the present disclosure includes laying-up a ceramic fabric to form a fiber preform that has a repeating pattern of seal arc sections, densifying the fiber preform with a ceramic matrix material to form a densified ceramic matrix composite body, and either before or after the densifying, cutting the fiber preform or the densified ceramic matrix composite body, respectively, along boundaries between the seal arc sections to separate the seal arc segments from each other.

In a further embodiment of any of the foregoing embodiments, each of the seal arc sections defines a leading face and trailing face, and the seal arc sections are arranged leading face-to-trailing face in the repeating pattern.

In a further embodiment of any of the foregoing embodiments, each of the seal arc sections includes a rib, and the boundaries are non-intersecting with the rib.

In a further embodiment of any of the foregoing embodiments, each of the seal arc sections defines opposed circumferential side faces, and the seal arc sections are arranged circumferential side face-to-circumferential side face in the repeating pattern.

In a further embodiment of any of the foregoing embodiments, each of the seal arc sections includes a rib, and the boundaries intersect the rib.

In a further embodiment of any of the foregoing embodiments, the seal arc sections are arranged as an array in rows and columns in the repeating pattern.

In a further embodiment of any of the foregoing embodiments, following the cutting, the seal arc sections are subjected to a coating process.

A further embodiment of any of the foregoing embodiments includes prior to the densifying, debulking the fiber preform by compressing the fiber preform in a tool.

In a further embodiment of any of the foregoing embodiments, the cutting is before the densifying.

In a further embodiment of any of the foregoing embodiments, the cutting is after the densifying, and the densifying is partial densification of the fiber preform.

A method according to an example of the present disclosure includes providing a fiber preform or a densified ceramic matrix composite body that has a repeating pattern of seal arc sections, and cutting the fiber preform or the densified ceramic matrix composite body along boundaries between the seal arc sections to separate the seal arc segments from each other.

In a further embodiment of any of the foregoing embodiments, each of the seal arc sections defines a leading face and trailing face, and the seal arc sections are arranged leading face-to-trailing face in the repeating pattern.

In a further embodiment of any of the foregoing embodiments, each of the seal arc sections includes a rib, and the boundaries are non-intersecting with the rib.

In a further embodiment of any of the foregoing embodiments, each of the seal arc sections defines opposed circumferential side faces, and the seal arc sections are arranged circumferential side face-to-circumferential side face in the repeating pattern.

In a further embodiment of any of the foregoing embodiments, each of the seal arc sections includes a rib, and the boundaries intersect the rib.

In a further embodiment of any of the foregoing embodiments, the seal arc sections are arranged as an array in rows and columns in the repeating pattern.

In a further embodiment of any of the foregoing embodiments, following the cutting, the seal arc sections are subjected to a coating process.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

In this disclosure, like reference numerals designate like elements where appropriate and reference numerals with the addition of one-hundred or multiples thereof designate modified elements that are understood to incorporate the same features and benefits of the corresponding elements.

DETAILED DESCRIPTION

Figure 1:
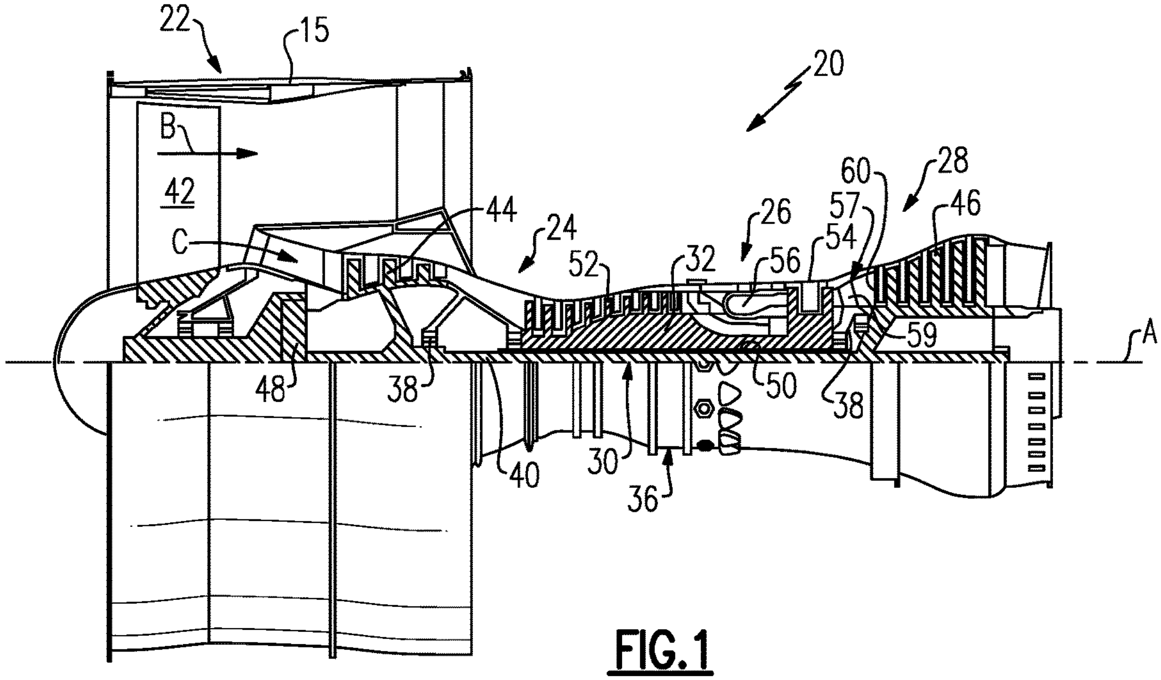
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of [(Tram °R)/(518.7°R)]0.5. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
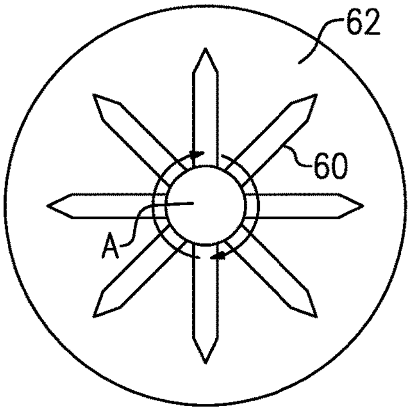
FIG. 2 illustrates a view from the turbine section of the engine.
Figure 3:
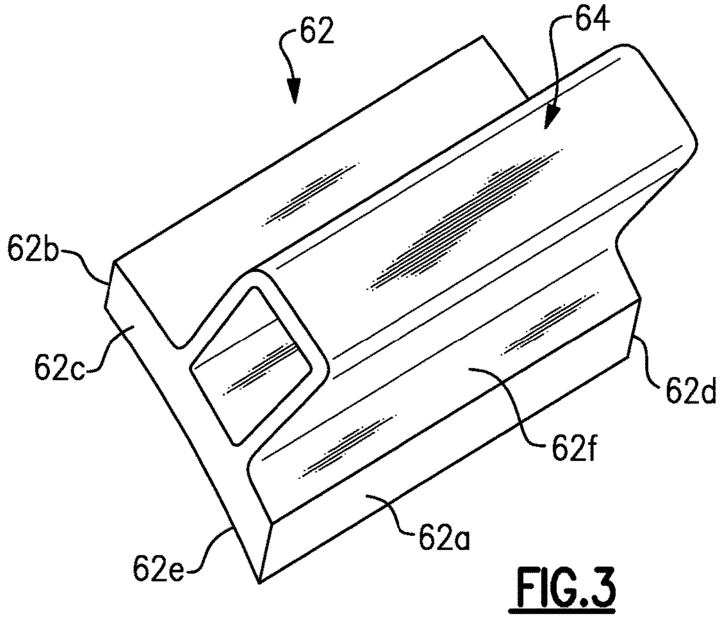
FIG. 3 illustrates a seal arc segment from the turbine section.

FIG. 2 illustrates an axial view from the turbine section 54, looking in an aft direction. A plurality of turbine blades 60 are rotatable about the engine axis A. Near the tips of the blades 60, there is a circumferential row of seal arc segments 62, also known as blade outer air seals. The seal arc segments 62 limit flow of combustion gases around the tips of the blades 60. A representative one of the seal arc segments 62 is shown in FIG. 3. The segment 62 has a leading face 62*a*, a trailing face 62*b*, opposed circumferential sides 62*c*/62*d*, a gaspath side 62*e* that faces radially inwardly toward the blades 60, and a non-gaspath side 62*f* that faces radially outwardly. The leading face 62*a* faces axially forward toward the front of the engine 20, the trailing face 62*b* faces axially aft toward the back of the engine 20. The opposed circumferential sides 62*c*/62*d* face in a tangential direction relative to the engine axis A.

Figure 4:
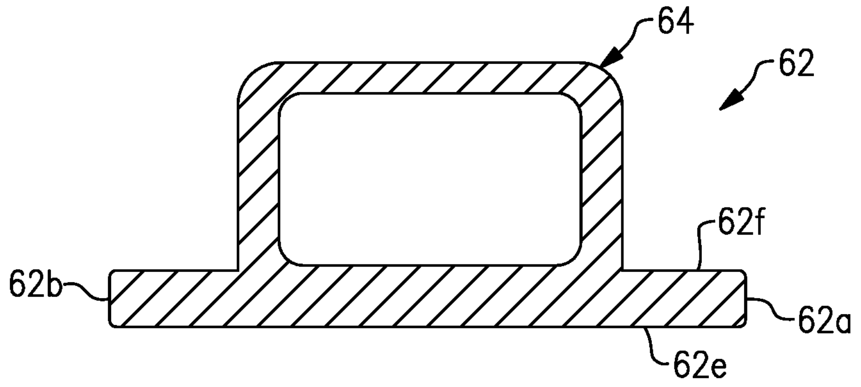
FIG. 4 illustrates a sectioned view of the seal arc segment.
Figure 5:
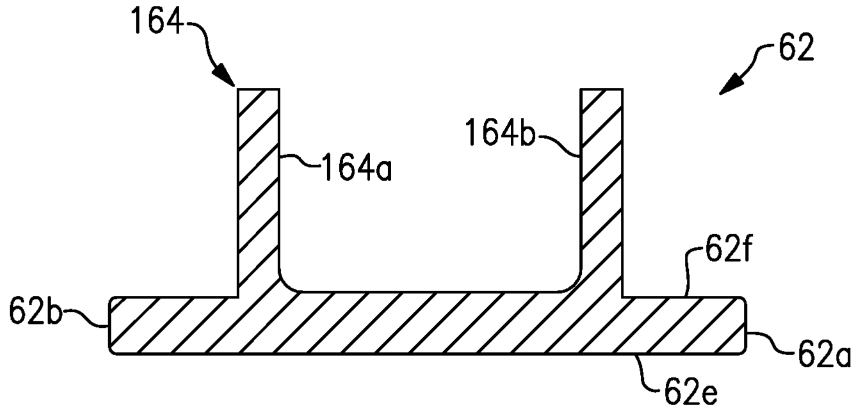
FIG. 5 illustrates a sectioned view of another example of a seal arc segment that has a different rib geometry.

The seal arc segment 62 includes a rib 64 that spans between the circumferential sides 62*c*/62*d*. As shown in a sectioned view of the seal arc segment 62 in FIG. 4, the rib 64 in this example is hollow and defines an enclosed interior region. The rib 64 may be used for mounting the seal arc segment 62 in the engine 20. The rib 64 is not limited to such a configuration and may have other configurations, including but not limited to the example shown in FIG. 5. The rib 164 in FIG. 5 includes two generally parallel, upstanding flanges 164*a* and 164*b*.

The seal arc segment 62 are formed of a ceramic matrix composite (CMC). A CMC material is comprised of a ceramic fibers disposed in a ceramic matrix. Example ceramic matrices are silicon-containing ceramic, such as but not limited to, a silicon carbide (SiC) matrix or a silicon nitride (Si3N4) matrix. Example ceramic fibers of the CMC are silicon-containing ceramic fibers, such as but not limited to, silicon carbide (SiC) fiber or silicon nitride (Si3N4) fibers. The CMC may be, but is not limited to, a SiC/SiC ceramic matrix composite in which SiC fabric is disposed within a SiC matrix. The ceramic fibers are provided in tows that are in an ordered arrangement as a fabric.

CMC seal arc segments can be manufactured individually by laying-up ceramic fabric and densifying the fabric with the ceramic matrix material. Such a process, however, is often labor intensive because it involved handling each of the seal arc segments individually through the various steps of the process. Additionally, manufacturing the seal arc segments individually can introduce variables that lead to variations in the finished segments. For instance, slight variations in fabric offsets can cause discontinuities that differ from part-to-part and vary part performance. In these regards, to facilitate reducing labor and decreasing variations, the disclosed seal arc segments 62 are manufactured as a group rather than individually.

Figure 6:
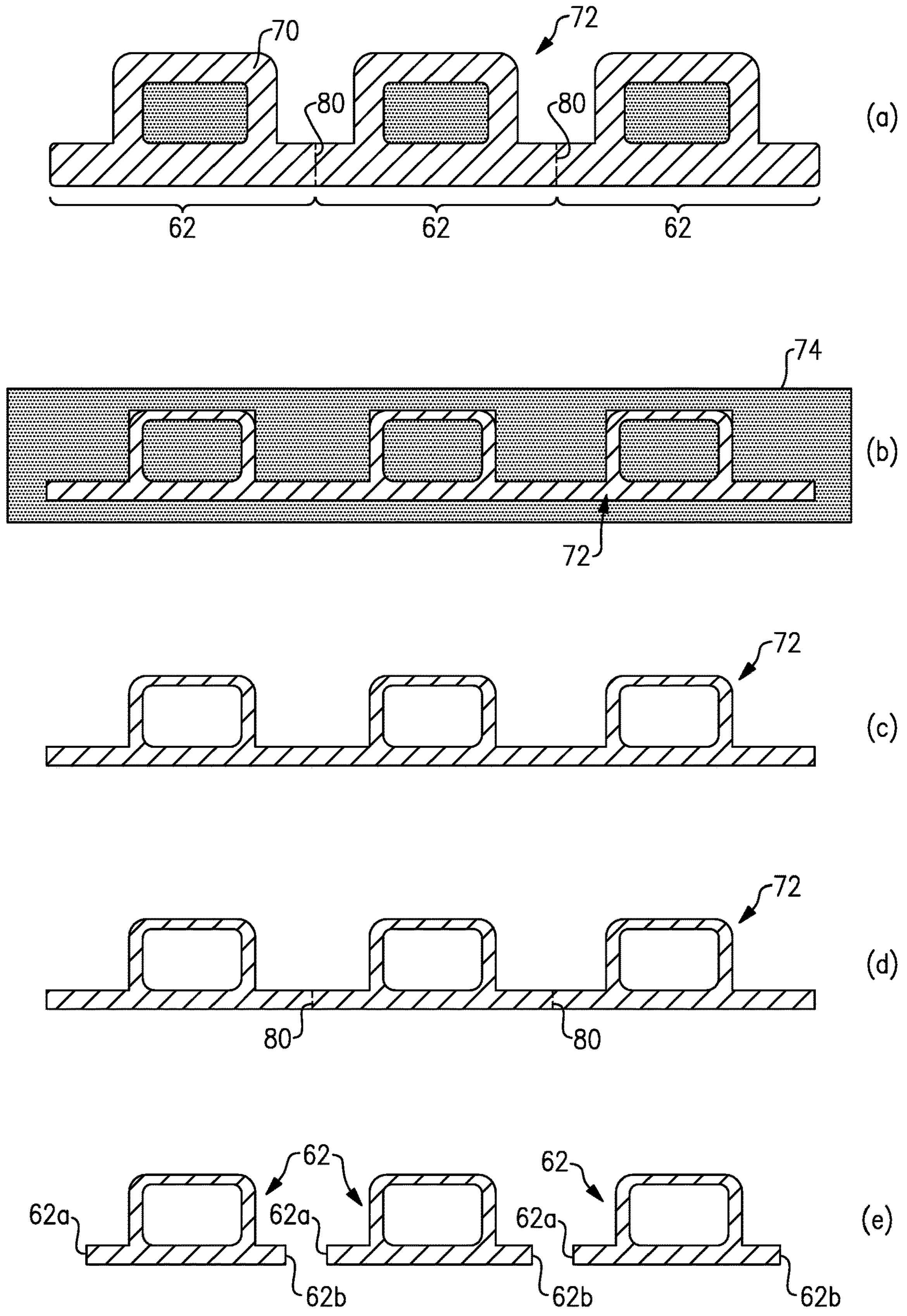
FIG. 6 depicts steps of a method of manufacturing seal arc segments as a group.

FIG. 6 depicts an example of a method for manufacturing the seal arc segments 62 as a group, i.e., processing multiple initially connected seal arc segments 62 at once. At step (a) a ceramic fabric 70 is laid-up to form a fiber preform 72. The lay-up may be a 2-dimensional layup, braid, 3-dimensional weave, or a combination of different lay-ups. In this example, the preform 72 is in the configuration of the hollow rib discussed above, in which case each rib 64 is formed around a mandrel in order to produce the hollow interior, but it may alternatively have a rib with the flanges 164*a*/164*b* or other type of rib.

The fiber preform 72 has a repeating pattern of the seal arc segments 62, which because they are formed from a single lay-up, are initially connected. In the repeating pattern of this example, the seal arc segments 62 are connected front-to-back, i.e., leading face-to-trailing face, although as will be discussed further below other arrangements are possible.

In this example, at step (b) the fiber preform 72 is then debulked in a debulking tool 74. The tool 74 compresses the fiber preform 72 to reduce its volumetric size to a near final design size, and at step (c) the debulked fiber preform 72 is removed from the debulking tool 74. In some designs, debulking may not be desired or needed and steps (b) and (c) can thus be excluded. At step (d) the fiber preform 72 is densified to form a densified ceramic matrix composite body 78. For example, the densification may be conducted by chemical vapor infiltration, polymer impregnation and pyrolysis, melt infiltration, or other known technique for matrix formation.

At step (e) the densified ceramic matrix composite body 78 is then cut along boundaries 80 between the seal arc segments 62 to separate the individual seal arc segments 62 from each other. The process used for cutting is not particularly limited and may include one or more of dry laser cutting, waterjet laser cutting, or mechanical cutting with a cutting tool such as a cutting wheel. As the cut surfaces may have open porosity, after the cutting the segments 62 may be further subjected to a coating process, such as a chemical vapor deposition process to provide additional matrix material as a coating, to seal over any open pores. Processing the seal arc segments 62 as a group facilitates reducing labor by utilizing a single lay-up process to produce multiple segments 62, thereby eliminating the need to handle and lay-up each segment individually. Moreover, as the segments 62 are formed from the same lay-up of ceramic fabric, there is reduced risk of fabric discontinuity from part-to-part. In additional examples, steps (a) through (d) may be conducted ahead of time, before the cutting of step (c), such that the densified ceramic matrix composite body 78 is provided as a prefabricated piece into the cutting step. In one alternative example, the cutting is conducted before the densifying. i.e., cutting the fiber preform. For instance, the fiber preform is cut prior to the debulking or after the debulking. The separate, cut seal arc segment fiber preforms are then debulked (if not already debulked) and then densified. In another alternative example, the cutting is conducted after partial densification, and the separated, partially densified seal arc segments are then further processed to full densification.

Figure 7:
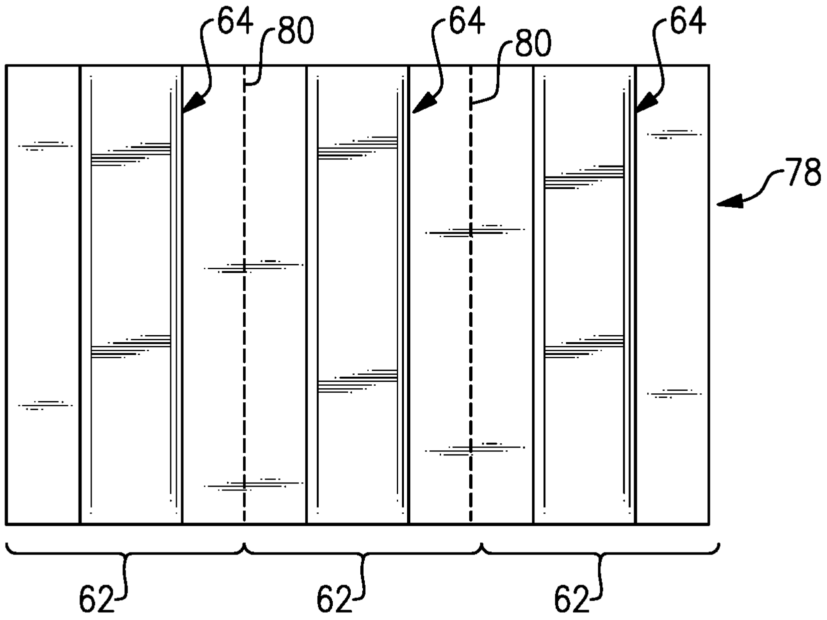
FIG. 7 illustrates an overhead view of a densified ceramic matrix composite body that includes a group of seal arc segments before being cut apart, and the seal arc segments are arranged in a single column forward face-to-trailing face.

FIG. 7 shows an overhead view onto the densified ceramic matrix composite body 78 of step (d). As indicated above, the seal arc segments 62 are connected leading face-to-trailing face along the boundaries 80, i.e., in a single column. In this configuration, each of the boundaries 80 runs along what will be the leading face 62*a* and trailing face 62*b* of adjacent seal arc segments 62 (once they are cut apart). The boundaries 80 are all non-intersecting with the ribs 64 such that cutting through the ribs 64 is avoided. Avoiding cutting through the ribs 64 may reduce cutting time and facilitate cutting accessibility, which may otherwise be hindered along the sides of the ribs 64, depending on the type of cutting process used.

Figure 8:
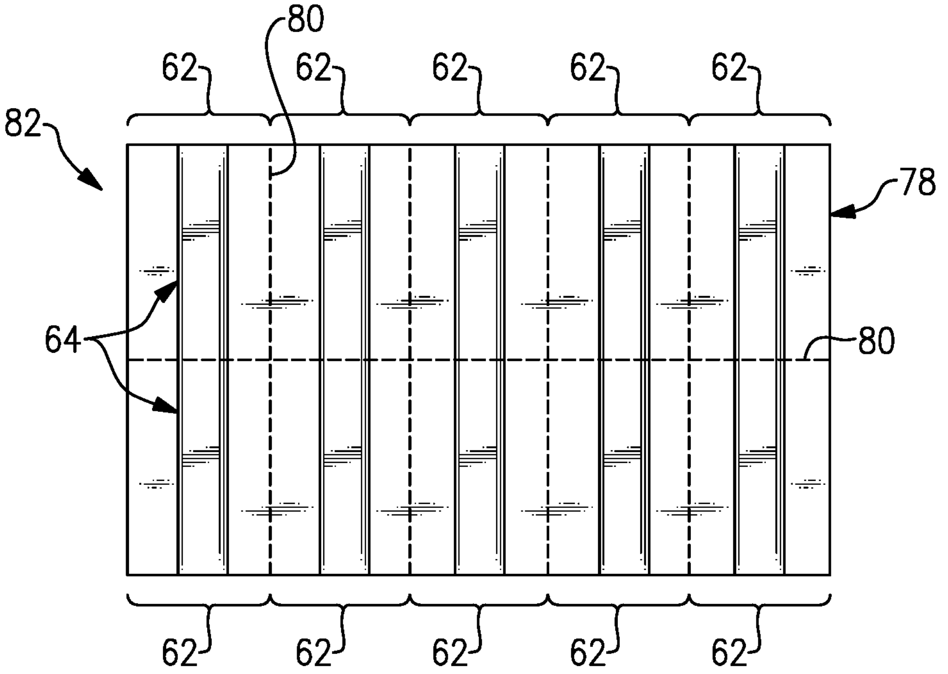
FIG. 8 illustrates an overhead view of another example of a densified ceramic matrix composite body that includes a group of seal arc segments before being cut apart, and the seal arc segments are arranged in an array of rows and columns.

Alternatively, as shown in FIG. 8, the seal arc segments 62 may be provided as an array 82 in rows and columns in the repeating pattern. In this case, the seal arc segments 62 are connected in rows leading face-to-trailing face along the boundaries 80 and in columns circumferential side face-to-circumferential side face. In this configuration, the boundaries 80 run along the leading and trailing faces 62*a*/62*b* and the circumferential side faces 62*c*/62*d* of the seal arc segments 62 (once they are cut apart). The boundaries 80 in the row direction are non-intersecting with the ribs 64, but the boundary or boundaries 80 in the column direction intersect the ribs 64. Thus, if the array 82 is used, a cutting technique that is compatible with cutting through the ribs 64 should be used. In one further alternative, the seal arc segments 62 may be connected in a single row circumferential side face-to-circumferential side face, although such a configuration will also require cutting through the ribs 64.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A method comprising:

laying-up a ceramic fabric to form a fiber preform that has a repeating pattern of seal arc sections;

densifying the fiber preform with a ceramic matrix material to form a fully densified ceramic matrix composite body;

after the densifying, cutting the densified ceramic matrix composite body, respectively, along boundaries between the seal arc sections to separate the seal arc segments from each other, each of the seal arc sections including a rib, and the boundaries are non-intersecting with the rib, wherein the cutting reveals an open porosity on cut surfaces of the densified ceramic matrix composite body; and sealing the open porosity by applying a coating of ceramic matrix material.

2. The method as recited in claim 1, wherein each of the seal arc sections defines a leading face and trailing face, and the seal arc sections are arranged leading face-to-trailing face in the repeating pattern.

3. The method as recited in claim 1, wherein each of the seal arc sections defines opposed circumferential side faces, and the seal arc sections are arranged circumferential side face-to-circumferential side face in the repeating pattern.

4. The method as recited in claim 1, further including, prior to the densifying, debulking the fiber preform by compressing the fiber preform in a tool.

5. The method as recited in claim 1, wherein the rib includes an upstanding flange.

6. The method as recited in claim 1, wherein the rib circumscribes an enclosed interior region.

7. The method as recited in claim 6, further comprising providing a mandrel and laying-up the ceramic fabric around the mandrel to form the enclosed interior region.

* * * * *